United States Patent
Archambault

(12) 
(10) Patent No.: US 6,173,444 B1
(45) Date of Patent: Jan. 9, 2001

(54) OPTIMIZING COMPILATION OF POINTER VARIABLES IN THE PRESENCE OF INDIRECT FUNCTION CALLS

(75) Inventor: Roch G. Archambault, Scarborough (CA)

(73) Assignee: International Business Machines Corporation, Armonk, NY (US)

( * ) Notice: Under 35 U.S.C. 154(b), the term of this patent shall be extended for 0 days.

(21) Appl. No.: 08/956,416

(22) Filed: Oct. 23, 1997

(30) Foreign Application Priority Data

Mar. 24, 1997 (CA) .................................................. 2200812

(51) Int. Cl.$^7$ ........................................................ G06F 9/44
(52) U.S. Cl. .................................................. 717/9; 395/709
(58) Field of Search .................................... 395/709, 705, 395/704, 701, 702, 703, 706, 707, 708, 710

(56) References Cited

U.S. PATENT DOCUMENTS

| | | | |
|---|---|---|---|
| 4,567,574 | * 1/1986 | Saade et al. | 395/709 |
| 5,448,737 | * 9/1995 | Burke et al. | 395/709 |
| 5,535,394 | * 7/1996 | Burke et al. | 395/709 |
| 5,555,412 | * 9/1996 | Besaw et al. | 395/708 |

FOREIGN PATENT DOCUMENTS 06348475   12/1994  (JP) .

OTHER PUBLICATIONS

Fundamentals of Data Structures E. Horowitz et al. pp. 301–309, Dec. 1983.*
Mathematical Structures for Computer Science G. Gersting pp. 228,231–232,380–382, Dec. 1993.*
Compilers Principles, Techniques and Tools, Aho et al. Chapters 1–10, Sep. 1985.*
Interprocedural Data Flow Analysis in the PResence of Pointers, Procedure Variables and Label Variables, W. Weihl, Dec. 1980.*
Efficeincy Flow Sensitive Interprocedural Computation of Pointer–Induced Aliases and Side Effects Choi, Dec. 1993.*
Analysis of Pointers and Structures David Chase, Dec. 1990.*
Points to Analysis bt Type Inference of Program with Strucutres and Unions B. Steensgaard, Jan. 1996.*
Flow Insensitive Interprocedural Alias Analysis in the Presence of Pointers M. Burke et al., Jan. 1992.*
On the Efficeint Engineering of ambitious Program Analysis, Choi et al, Dec. 1994.*
Efficiency Detection of All Pointer and Array Access Errors Austin et al., Jun. 1994.*
Interprocedural May–Alias Analysis for Pointers Beyond k–limiting Deutch, Jun. 1994.*
Context Sensitive Interprocedural Points to Analysis in the Presence of Function Pointers Emami et al, Nov. 1993.*
Efficient Context Sensitive Pointer Analysis for C Programs Wilson et al., Dec. 1995.*
A Storeless Modle of Aliasing and its Abstractions using Finite Reps. of Right Regular Equivalence Relations Deutch, Apr. 1992.*
Set Based Program Analysis, by N. Heintze, Dec. 1992.*
Program Decomposition for Pointer–induced Aliasing Analysis Zhang et al., Mar. 1996.*

* cited by examiner

*Primary Examiner*—Eric W. Stamber
*Assistant Examiner*—Todd Ingberg
(74) *Attorney, Agent, or Firm*—Whitham, Curtis & Whitham; Jay P. Sbrollini, Esq.

(57) ABSTRACT

Effective use of optimizing techniques during compilation is difficult in programs that make liberal use of pointers or indirect function calls. The indirection often means that the compiler cannot precisely determine the set of objects pointed to by a pointer at a specific location in the program, and therefore cannot efficiently eliminate pointer redundancies in the code. The present invention provides an optimising method that reduces the size of alias sets associated with program pointers. During an initial compilation phase, intra-procedural information about pointer variables referenced in each function of the program is gathered and saved in a data structure called the pointer alias graph. In the middle phase, the pointer alias graphs from all the compilation units for the program are combined to form a universal pointer alias graph and then transitive closure is performed on the universal pointer alias graph to produce a reduced graph containing the list of objects that each pointer variable can point to. In the final phase, all the files are re-compiled using the universal pointer alias graph as input, resolving all occurrences where pointer variables are de-referenced.

8 Claims, 3 Drawing Sheets

OPTIMIZING COMPILATION OF POINTER VARIABLES IN THE PRESENCE OF INDIRECT FUNCTION CALLS

BACKGROUND OF THE INVENTION

1. Field of the Invention

The present invention generally relates to compiler optimizations, and in particular to a technique for reducing redundant pointer information.

2. Background Description

Compilation is a process used for translating high level language statements in a computer program into machine instructions executable by the target computer. Optimization is a general term for modifications applied to source code, object code or any intermediate code present during compilation, in order to improve the efficiency of the program being compiled. Usually optimization either:

a) aims to overcome pessimistic assumptions implied by language rules that can cause redundancies in the compiled code. This can result in unnecessary memory allocation for the additional (that is, redundant) code; or b) exploits a particular hardware for different environments. The present invention is directed to an optimization technique of the first type.

Compilation may, broadly speaking, be divided into a front end phase in which the source code program is translated, through steps of lexical, syntactic and semantic analysis, into an intermediate representation, and a back end phase in which the intermediate representation is translated for output in object code modules, called compilation units, for linking into executable files. Optimization may take place at various stages during this compilation process, but generally speaking, occurs in the back end.

Usually optimization algorithms work on a representation of the aspect of the program to be optimised. This representation is usually produced by a pre-compilation step or by the first pass of a two-pass compiler. For example, U.S. Pat. No. 5,107,418 for "Method for Representing Scalar Data Dependencies for an Optimizing Compiler" describes a method for creating a local scalar data dependence graph for each basic block of the program. This local analysis is used to form a global data dependence graph that shows data dependencies in the context of a control flow graph within a single function that can be used for later optimizations in the compiler.

Most modern programming languages offer the capability to access a data object, or function object in the case of object oriented programming languages like C++, indirectly through the use of a pointer variable. A pointer is a reference to the location or address of some region in memory where the data or function is stored. Typically, the value of the pointer variable is the object's address in storage. Because the reference to the object is indirect, through the pointer, calls that use function pointers are referred to as indirect calls.

Pointer references are particularly useful in complex programs where the exact number of elements in different types of data structures may not be ascertainable at compilation time. The number may vary with the program's actions as it is running. The use of pointer references allows individual pieces of storage to be allocated as needed, so that the required amount of storage is available at any given moment during program execution.

When used, the pointer variable is first initialised to the address of the specific object, and then de-referenced in order to access the object. Some languages permit the user to modify or copy pointer variables for the purpose of traversing an aggregate object, such as an array. Pointers may also be modified or copied for dynamically selecting an object to be operated upon.

These types of manipulations of pointer variables can lead to situations where the compiler cannot precisely determine the set of objects (data or function objects) pointed to by a pointer variable at a specific location in the program. In these situations, the compiler must use safe assumptions to determine the scope of the pointer's object set. These assumptions, called aliasing assumptions, are usually specified by the language being compiled. Aliasing assumptions are often very pessimistic. They drastically reduce the level of optimization that can be performed by reducing the level of redundancies which can be eliminated.

This problem can be illustrated using the following simple code example in which the use of *p and *q indicate de-referencing of the pointers p and q, respectively:

```
s1: p=&a;
s2: q=&b;
    ......
    ......
s5: ...=*p+2;
    ......
s7: *q=...
    ......
s9: ...=*p+2;
```

The compiler can trace the values of p and q, and determine that they are handles to different objects by keeping track of the set of objects associated with a pointer variable. This set of objects is the alias set associated with the pointer variable.

However, the compiler cannot normally tell if statement s7 invalidates the value of the expression in statement s5, and as a result, it cannot assume that the same expression found in statement s9 is redundant. It must generate code which will recompute the value of the expression *p+2 for statement s9.

While the example illustrates only a single redundancy, the magnitude of the problem can be realised over a large program of thousands of lines of code.

One way to reduce the size of the alias sets is to provide the user with alias assertion options giving direct control over the aliasing assumptions. However, correct use of these options requires great skill and time on the part of the user, and increased program complexity makes it much more difficult to generalise appropriate aliasing assumptions.

The preferred approach is to develop an automatic solution to the problem, and to that end, a number of techniques have been developed for computing the approximate set of objects that a pointer can point to at any specific point in the program, such as the following:

1) "Efficient context-sensitive pointer analysis for C programs", Robert Wilson and Monica Lam, SIGPLAN '95;

2) "Points-to analysis in almost linear time", Bjarne Steensgaard, Technical Report MSR-TR-95-08, Microsoft Corporation;

3) "A safe approximate algorithm for interprocedural pointer aliasing", William Landi and Barbara Ryder, SIGPLAN '92;

4) "Almost linear time points-to analysis", William Landi, in POPL '95;

5) "Context-sensitive interprocedural points-to analysis in the presence of function pointers", Maryam Emami, Rakesh Ghiya and Laurie Hendren, SIGPLAN '94;

6) "Interprocedural may-alias analysis for pointers: Beyond k-limiting", Alain Deutsch International Conference on Computer languages, IEEE '92; and 7) "Efficient flow-sensitive interprocedural computation of pointer-induced aliases and side effects", Jong-Deok choi, Michael Burke and Paul Carini, SIGPLAN '93.

Many of the existing techniques are computationally expensive and don't provide a solution for programs that contain indirect calls.

SUMMARY OF THE INVENTION

It is therefore an object of the present invention to provide a general use technique for reducing the size of alias sets in production compilers that is precise enough to improve optimization.

It is also an object of the present invention to provide an alias set optimization that is efficient in terms of computation time and memory usage.

A further object of the invention is to provide an alias set reduction technique for all pointer references, including indirect calls that use pointer references.

Therefore, the present invention provides a method for optimizing a program containing indirect function calls. The method, implemented during compilation, includes the steps of constructing, in each compilation unit, a data set of interprocedural definitions for each referenced pointer in the compilation unit. The data sets from all compilation units are combined to construct a universal data set and transitive closure is performed to eliminate redundant definitions and reduce the universal data set. The program is recompiled using the reduced universal data set.

Preferably each data set consists of a set of objects associated with a pointer variable for each reference to that pointer variable. Further, each data set consists of a pointer alias graph developed through data flow graphing.

The invention also provides a computer program product consisting of a computer usable medium having computer readable program code means embodied thereon for programming a computer to perform the method of the invention described herein.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a flow diagram of the initial compilation phase to gather intraprocedural information about pointer variables; and FIG. 2 is a flow diagram illustrating the steps for resolving all values of local pointer variables in the pointer alias graph to develop a pointer alias graph which summarizes the function.

DETAILED DESCRIPTION OF A PREFERRED EMBODIMENT OF THE INVENTION

In summary, the preferred method of the invention includes:

an initial compilation phase in which intraprocedural information about pointer variables referenced in each function of the program is gathered and saved in a data structure called the pointer alias graph;

a middle phase in which the pointer alias graphs from all the compilation units for the program are combined to form a universal pointer alias graph, and then transitive closure is performed on the universal pointer alias graph to produce a reduced graph containing the list of objects that each pointer variable can point to; and a final phase in which all the files are re-compiled using the universal pointer alias graph as input, resolving all occurrences where pointer variables are de-referenced.

The preferred embodiment is described as it applies to pointer variables in C, a programming language that, in general, makes liberal use of pointer variables. However, it will be understood by those skilled in the art that the method of the invention applies to other programming languages that support pointer use, including C++ and FORTRAN.

Conventional optimization techniques are generally intraprocedural; summary information for each procedure is collected during a first pass performed at compile time. The present invention also utilises interprocedural analysis, a second pass performed at link time, in which the collected information is merged and used to compute an interprocedural solution. The application is then re-built (re-compiled) using the interprocedural solution to optimize the application. A full discussion of a two-pass interprocedural analysis system can be found in Canadian Patent Application No. 2,102,089 titled "Recompilation of Computer Programs for Enhanced Optimization", which is commonly assigned and incorporated herein by reference. This application was laid open on Apr. 30, 1995.

Figure 1:
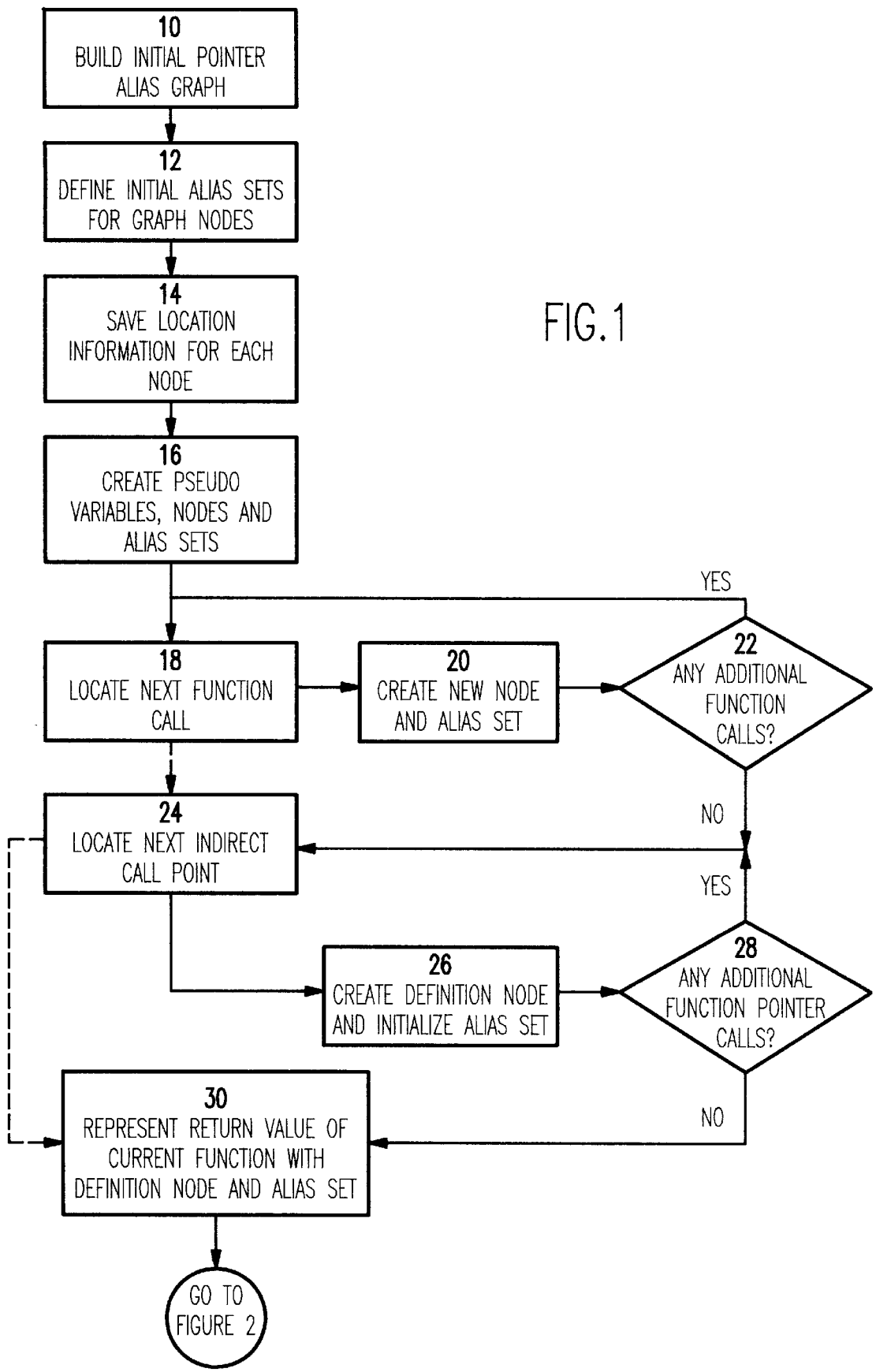
FIGS. 1 and 2 are flow diagrams illustrating the application of intraprocedural analysis to the uses and definitions of all pointer variables within the scope of a single function. Specifically.
Figure 2:
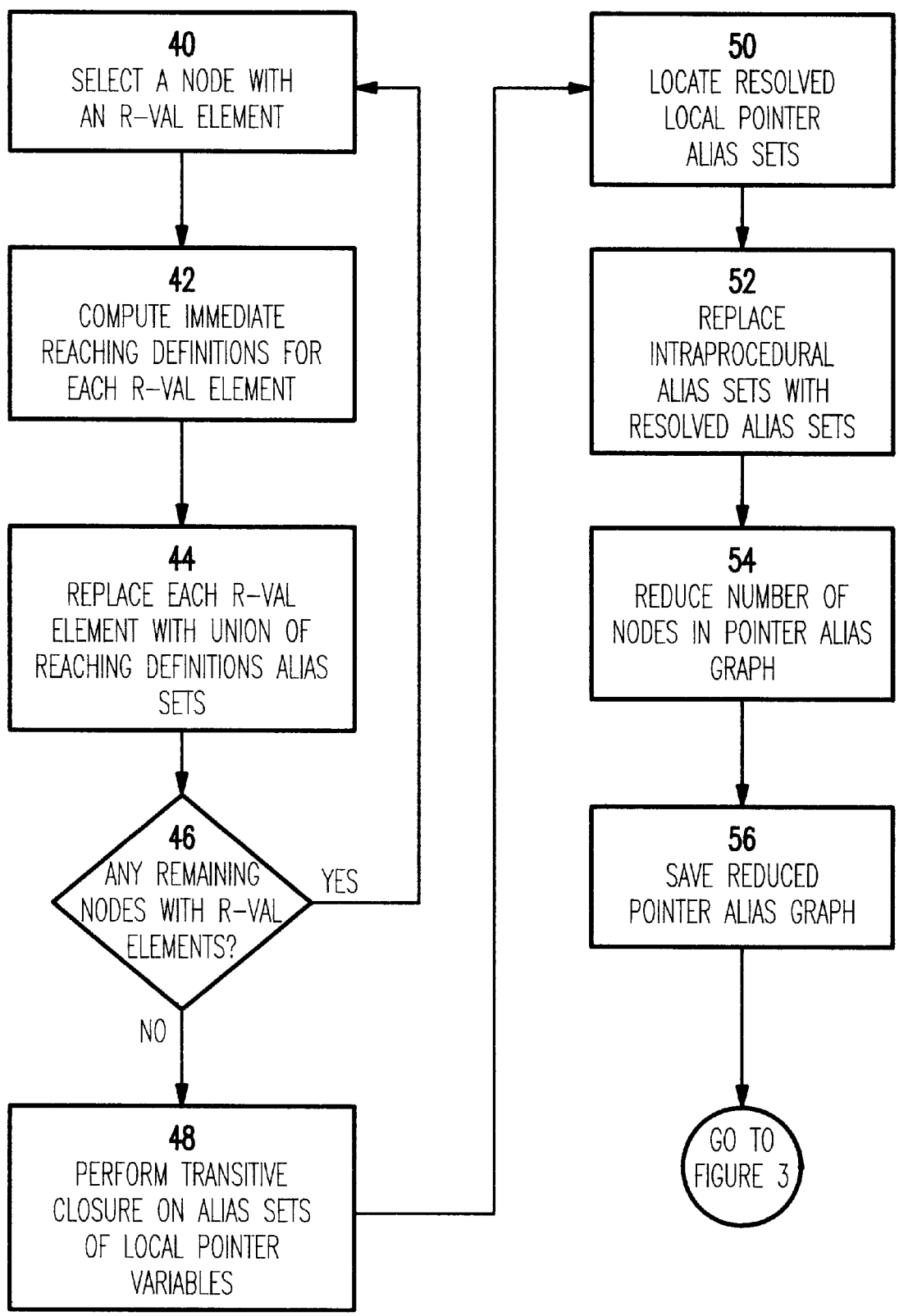

Referring to the drawings associated with the present disclosure, FIGS. 1 and 2 illustrate the steps taken through the initial intraprocedural analysis phase to develop a pointer alias graph for each function for later use in the middle interprocedural analysis phase illustrated in FIG. 3.

Terms used in this description of the preferred embodiment have the following definitions:

the l-val of an object is its address. This includes the addresses of functions and of nameless data object (for example, from heap or stack storage). Heap or stack storage acquired by a call to the malloc or alloca ANSI C library routine is given a global name. In the invention, the l-val of heap or stack storage is treated in the same manner as the l-val of a named object;

the r-val of an object is its value at a given execution point in the program. For the purposes of the present invention, only the r-val of certain classes of pointer variables are used: function calls (or local pointer variables), external or file scope variables function formal or actual arguments and function return values. Most C implementations permit pointer variables to be converted to and from integers. Therefore, any integer variable that could possibly contain an address is also included in the definition of r-val; and the universal object represents the list of all l-vals in the entire program, once program closure is reached. The universal object represents the r-val of certain classes of pointer variables not included in the above definition of r-val. These classes of pointer variables include multiple levels of pointer de-referencing (one r-val dependent on another r-val, as in the reference, in C, to **p where p is declared as a pointer to a pointer), pointer variables whose addresses have already been taken (l-vals already exist), and pointer variables that are structurally aliased, such as in a C union or array construct.

Referring first to FIG. 1, a pointer alias graph is built for each function based on the information gathered in the first intraprocedural pass of the compiler (block 10). Standard data flow gathering techniques are used to develop the pointer alias graph. The nodes in the graph represent either a definition of a pointer variable or a use of a pointer variable, and each node has an associated alias set. The initial alias sets for the nodes of this graph are defined (block 12) as follows: the initial alias set for definition nodes is the right hand side of the pointer variable assignment operation, and the initial alias set for use nodes is the value of the object at that execution point (the r-val). Location information, the basic block number (relative to the flow graph) and position within the basic block, is saved for each node (block 14).

In order to provide a complete representation of pointer use in the function for the interprocedural analysis to follow, global unique names, called pseudo pointer variables, are assigned to each formal argument, function return value and global (or file scope) variable. Corresponding nodes and alias sets are created on the pointer alias graph (block 16).

Several actions follow, as illustrated in blocks 18 through 30 of FIG. 1. However, it should be pointed out that the sequence of steps illustrated in these blocks of the flow diagram are not intended to suggest temporality. Rather, the representations of function calls, function pointer calls and the return value for the function are created as these values are encountered in the code.

For each function call encountered in the current function (blocks 18 and 22), new nodes for the pointer graph and alias sets are created (block 20). Each argument in the function call is represented by a definition node of the formal argument with an alias set initialized to the actual argument (either an r-val or l-val), and the return value for the function is represented by a definition node of a local pseudo pointer variable representing the function's return value at this call point and an alias set initialised to the r-val of a global pseudo pointer variable which represents the resolved return value.

Indirect call points (calls through function pointers) are also represented (blocks 24 and 28), each by a definition node of a global pseudo pointer variable. The alias set for this node is initialised to the r-val of the actual pointer variable specified on the indirect call (block 26).

In addition, the return value of the current function is represented by a definition node with an alias set which is the union of all return points. The pseudo pointer variable being defined represents the resolved return value (block 30).

The resulting alias graph includes nodes and alias sets for all of the pointer uses in the function, and this is then subjected to further analysis, following the steps set out in FIG. 2, for resolution of the alias sets of all of the pointer variables of local scope.

As illustrated in the flow diagram of FIG. 2, for each node with an r-val element in its alias set (block 40), the immediate reaching definitions for the r-val elements are computed (block 42). Defining immediate reaches, or the value each element has reached at particular points in the program, is a common data flow problem, and a number of different approaches for calculating immediate reaches in local pointer analysis exist in the prior art. What is important is that the algorithm used traverses all of the intervening reaching definitions. This can be illustrated using the following example:

```
q=&y;
if ( )
    p=q;
else
    p=&w;
r=p;
```

This short code segment has two branches; p1=q and p2=&w. The expression r=p; is the join point. The reaching definition of r=p; is the set {p=q; || p=&w;}, and r can simply be redefined as:

r=(p1=||=p2).

Each r-val element in the node's alias set is replaced with the union of alias sets of all reaching definitions (block 44), as illustrated by the following example:

| | C program | Initial graph nodes | After immediate reaches |
|---|---|---|---|
| 1 | lp1=&a; | lp1-1<={&a} | lp1-1<={&a} |
| 2 | lp2=&b; | lp2-2<={&2} | lp2-2<={&b} |
| 10 | if (...) | | |
| 11 | lp3=lp1+I; | lp3-11<={lp1} | lp3-11<={lp1-1} |
| 12 | else | | |
| 13 | lp3=lp2+j; | lp3-13<={lp2} | lp3-13<={lp2-2} |
| 20 | lp4=lp3+k; | lp24-20<={lp3} | lp4-20<={lp3-11,lp3-13} |
| 30 | *lp4=3; | lp4-30<=>{lp4} | lp4-30<=>{lp4-20} |

Once all nodes with local r-val elements have been resolved (block 46), transitive closure, the elimination of intervening logic statements, is performed on the alias sets of the local pointer variables (block 48). A transitive relationship may best be described as If a=b and b=c, then a=c Transitive closure is the iterative process of propagating transitive relationships until the alias sets are stable and there is no possibility of the addition of further values. The closure process is referred to as iterative because some of the relationships may be cyclic.

In the method of the invention, alias sets of global pointer variables, formal arguments and return values are not propagated at this stage because the interprocedural information for them is not yet available.

Using the example set out above, after transitive closure, the nodes are as follows:

```
lp1-1<={&a}
lp2-2<={&b}
lp3-11<={&a}
lp3-13<={&b}
lp4-20<={&a, &b}
lp4-30<={&a, &b}
```

The alias set for each use or de-reference of a local pointer variable now contains only l-val elements and is resolved. The alias sets computed by the front end of the compiler for intraprocedural analysis are replaced with the resolved alias sets (block 52). This results in a much smaller alias set because a number of the pessimistic redundancies have been removed.

In preparation for interprocedural analysis, the pointer alias graph is reduced in size by eliminating some of the nodes (block 54). This is done by:

removing all definition and use nodes that involve local pointer variables;

removing all use nodes of global pointer variables and function return values; and merging all definitions nodes of a specific global pointer variable, formal argument or return value into a single definition (union alias sets). Interprocedural analysis of the pointers will treat these in a flow insensitive manner.

The resulting pointer alias graph contains only definition nodes for global pointer variables, the return value of the current function and formal arguments for any called function. The only r-val elements contained in the alias sets associated with these definition nodes are of global pointer variables, formal arguments and return values; the remaining pointer values are l-val elements.

The reduced pointer alias graph set is saved (block 56), either to persistent memory or written to a file, for use in the interprocedural analysis described below in conjunction with FIG. 3.

Each file of the application is compiled performing the same steps of intra procedural analysis illustrated in FIGS. 1 and 2, and the resulting pointer alias graphs are saved.

Figure 3:
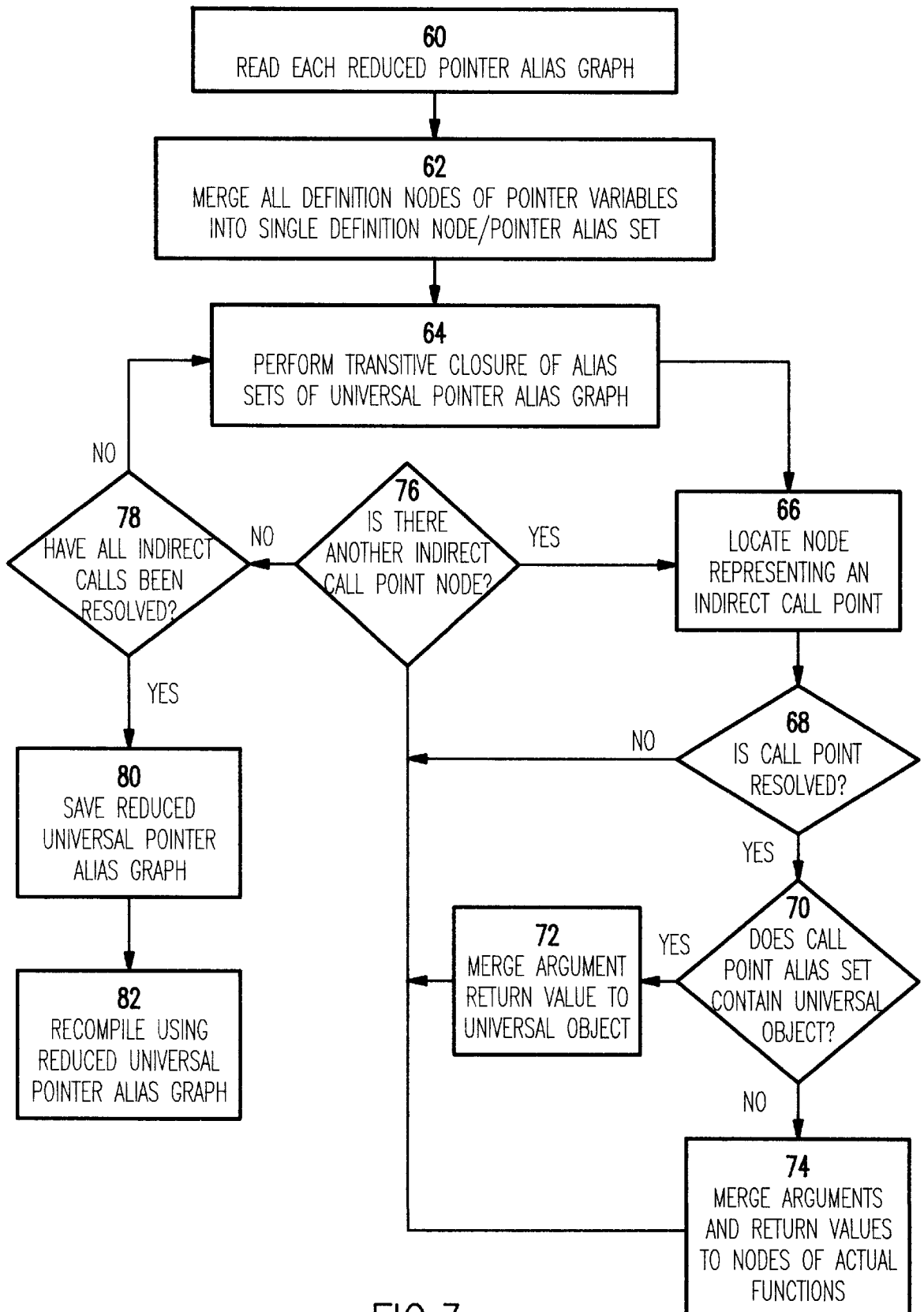
FIG. 3 is a flow diagram illustrating the steps in interprocedural analysis for developing a universal pointer alias graph for use in a optimized recompilation, according to the invention.

The interprocedural analysis illustrated in FIG. 3 is essentially an extension of the intraprocedural analysis illustrated in FIGS. 1 and 2. In summary, all of the pointer graphs developed through the intraprocedural pass are gathered into a universal pointer alias graph for the whole program. Transitive closure is performed and the resulting reduced graph is used as input to a second interprocedural pass.

Referring now to FIG. 3, each reduced pointer alias graph is read from memory (block 60). All definition nodes (from the accumulated graphs) for each pointer variable are merged into a single definition node, and the alias sets of each of the nodes are combined (union) to form the universal alias set for a specific pointer variable (block 62).

Transitive closure of the alias sets in the universal pointer alias graph is performed (block 64). The transitive closure performed at this stage is similar to the process to create alias sets performed during intraprocedural analysis except that alias sets are propagated for all pointer variables in the universal graph.

obtaining transitive closure of all the universal pointer graph may be an iterative process when the application includes indirect calls.

Program closure is a pre-requisite to most interprocedural optimization techniques, including the present one. In order to achieve closure, all edges in a call graph must be resolved. A program contains indirect calls must first be analysed to resolve the indirect calls to reach program closure. The indirect calls are resolved by tracing through the pointers which functions are being called in order to propagate aliases into (or out of) that function.

Once transitive closure has been performed of the alias sets (block 64), nodes representing indirect call points are located (blocks 66, 76). For each of these, if the call point is resolved, that is, the alias set contains only l-val elements (block 68) and the alias set does not contain a universal object (block 70), then the argument is merged into and the value nodes related to the call point are returned to the corresponding nodes of the actual function which may be called (block 74). If the resolved call point does contain a universal object (block 70), then the argument is merged into and the value nodes related to this call point are returned to the corresponding nodes of each function in the universal object (block 72).

If some indirect call points have not been resolved (block 78), the loop is reiterated, beginning with the performance of transitive closure (block 64).

Once no unresolved indirect call point nodes remain in the graph (blocks 76,78), the reduced universal pointer alias graph is saved in persistent memory (block 80). Each of the files is recompiled performing the intraprocedural algorithm using the final universal pointer alias graph as input (block 82). Since the universal pointer alias graph represents the complete aliasing relationships (following program closure), this pass can propagate aliases involving global pointer variables, leading to a much higher number of resolved alias sets containing only l-val elements.

The interprocedural stage of the invention can be illustrated using the following C example:

```
double * accumulate (double * accumulator,
        double * array,
        int num_elements)
static double local_accumulator;
int     index;
if (accumulator == NULL)
    accumulator = &local_accumulator;
for (index = 0; index < num_elements; ++index)
    * accumulator +=array[index];
return accumulator;
double * global_ptr;
main ()
    double acc;
    double arr[10];
    global_ptr = accumulate (&acc, &arr[0], 10);
```

Using this example, an initial global pointer alias graph of accumulate function is constructed following the steps of FIGS. 1 and 2. Pseudo pointer variables, accumulate-arg1, accumulate-arg2 and accumulate-return_value are created to represent the formal arguments and the return value for the function. The return value is dependent on the actuals of the first argument. Initially both argument values are empty, but once they are determined, the return value can be computed.

After local pointer analysis at one call point, the relationship of the pseudo variables for accumulate are as follows:

```
accumulate-arg1 -> list if actual values of arg1
accumulate-arg2 -> list of actual values of arg2
accumulate-return_value -> accumulate-arg1,
    &local_accumulator
```

The same steps are taken to define a global alias graph and pseudo pointer variables for the main function. After local pointer analysis, the relationship of the pseudo variables representing the formal arguments and return value are:

```
accumulate-arg1 -> &acc
accumulate-arg2 -> &arr
global-ptr -> accumulate-return_value
```

These two global pointer alias graphs are combined to form the universal graph (blocks 60, 62, FIG. 3) with the following relationship:

```
accumulate-arg1 -> &acc
accumulate-arg2 -> &arr
global_ptr -> accumulate-return_value
accumulate-return_value -> accumulate-arg1,
   &local_accumulator
```

Following transitive closure (block 64), the graph is reduced to:

```
accumulate-arg1 -> &acc
accumulate-arg2 -> &arr
global-ptr -> &acc, &local_accumulator
accumulate-return_value-> &acc, &local_accumulator
```

In this simple example, the remaining steps in FIG. 3 have been dispensed with because there are no nodes remaining in the graph representing an indirect call point (blocks 66, 76). The information in the reduced graph is saved (block 80) for use in further optimization or in re-compilation (block 82).

Further modifications to the invention that would be obvious to those skilled in the art are intended to be covered within the scope of the appended claims.

We claim:

1. A method, during compilation, for optimizing a program with pointer variable references and indirect function calls, comprising:
   constructing, in each compilation unit, a pointer alias graph which describes the relationship between all pointer variables being referenced in each respective compilation unit;
   constructing, using the pointer alias graph, a pointer target set for each pointer variable referenced in each respective compilation unit;
   combining pointer alias graphs from all compilation units to construct a universal pointer alias graph;
   performing transitive closure to eliminate intervening nodes and reduce the universal pointer alias graph;
   constructing, using the universal pointer alias graph, a universal pointer target set for each pointer variable reference in the program; and
   recompiling each compilation unit of the program using the universal pointer target sets.

2. The method, according to claim 1, wherein each pointer target set comprises a set of objects associated with a pointer variable for each reference to that pointer variable.

3. The method, according to claim 2, wherein each pointer target set is constructed using a pointer alias graph developed through data flow graphing.

4. The method, according to claim 1, further comprising the step of replacing definitions for indirect calls in the reduced universal pointer alias graph with definitions for direct function calls prior to recompilation.

5. The method, according to claim 1, wherein the step of recompiling all compilation units of the program includes resolving all occurrences where pointers are dereferenced by using the universal pointer alias graph.

6. A program storage device readable by machine tangibly embodying a program of instructions executable by the machine to perform method steps for optimizing a program with pointer variable references and indirect function calls during compilation, said method steps comprising:
   constructing, in each compilation unit, a pointer alias graph which describes the relationship between all pointer variables being referenced in each respective compilation unit;
   constructing, using the pointer alias graph, a pointer target set for each pointer variable referenced in each respective compilation unit;
   combining pointer alias graphs from all compilation units to construct a universal pointer alias graph;
   performing transitive closure to eliminate intervening nodes and reduce the universal pointer alias graph;
   constructing, using the universal pointer alias graph, a universal pointer target set for each pointer variable reference in the program; and
   recompiling the program using said reduced universal data set.

7. The program storage device, according to claim 6, wherein said method steps further comprise the step of replacing definitions for indirect calls in the reduced universal pointer alias graph with definitions for direct function calls prior to recompilation.

8. In a two-pass optimizing compiler adapted to gather intraprocedural function information during an initial compilation pass, a method for reducing pointer alias sets for use in a program recompilation comprising:
   constructing, in each compilation unit, a local pointer alias graph for each function based on the information gathered in the initial compilation pass wherein the nodes in the graph represent all pointer definitions and uses in the function and wherein each node has an associated local pointer alias set;
   constructing, using each local pointer alias graph, a pointer target set for each pointer variable referenced in each respective compilation unit;
   for any node containing a value that is not an object address, computing immediate reaching definition alias sets and replacing that value with a union of the immediate reaching definition alias sets;
   performing transitive closure on all local pointer alias sets;
   replacing local pointer alias sets with resolved local pointer alias sets;
   reducing the number of nodes in the local pointer alias graph;
   merging all definition nodes from all local pointer alias graphs into a single definition node and corresponding pointer alias sets to create a universal pointer alias graph for each pointer;
   performing transitive closure on each universal pointer alias graph; and
   resolving indirect callpoints and performing transitive closure on each universal pointer alias graph.

* * * * *